Figure 1:
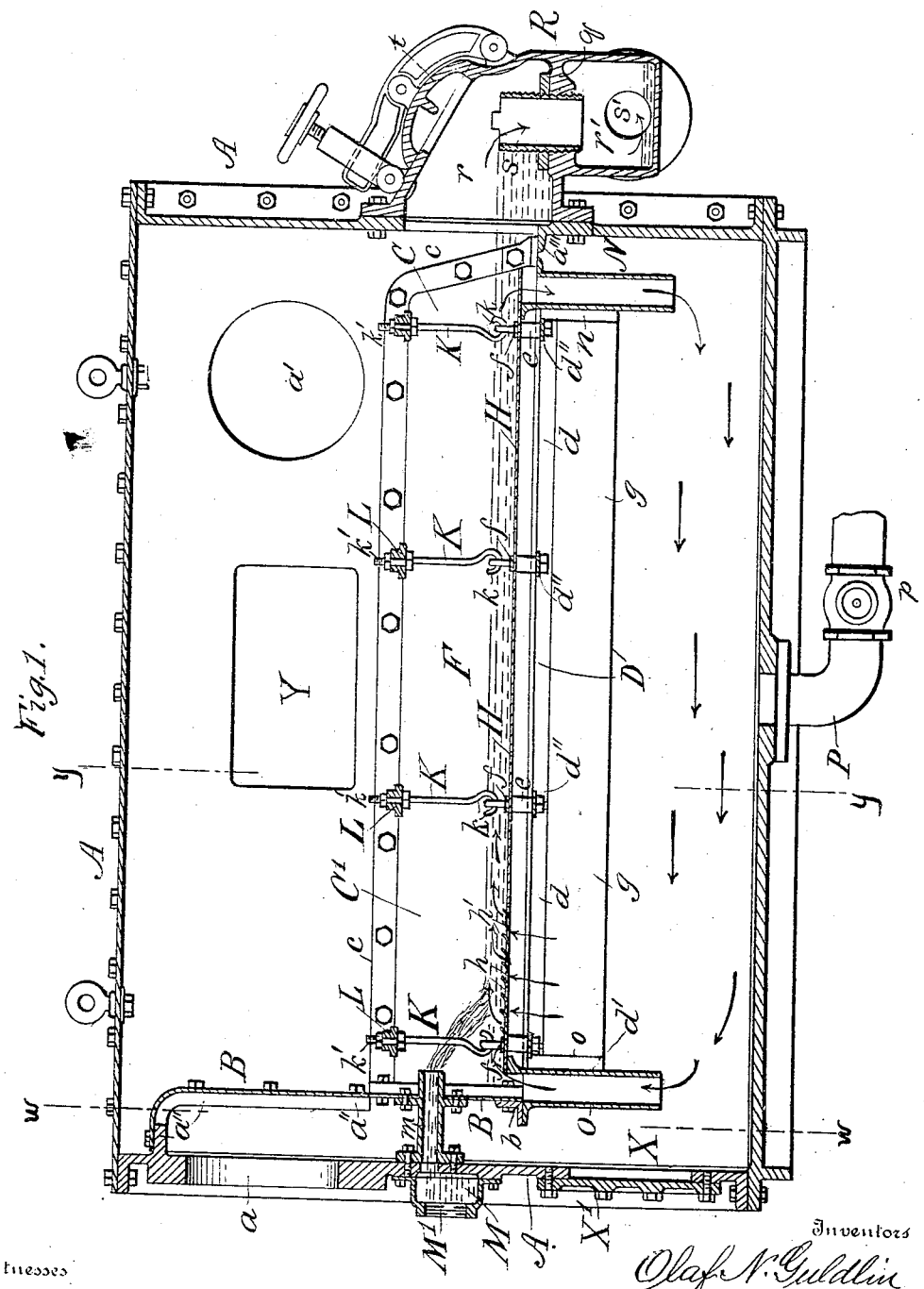

No. 764,049. PATENTED JULY 5, 1904.
O. N. GULDLIN.
GAS WASHER.
APPLICATION FILED OCT. 28, 1902.
NO MODEL. 4 SHEETS—SHEET 2.

Witnesses
Morris A. Clark
Wm. H. Chadsey

Inventor
Olaf N. Guldlin
By
E. B. Clark
Attorney

No. 764,049. PATENTED JULY 5, 1904.
O. N. GULDLIN.
GAS WASHER.
APPLICATION FILED OCT. 28, 1902.
NO MODEL. 4 SHEETS—SHEET 3.

Witnesses
Norris A. Clark
Wm. H. Chadsey

Inventors
Olaf N. Guldlin
by E. B. Clark
Attorney

No. 764,049. PATENTED JULY 5, 1904.
O. N. GULDLIN.
GAS WASHER.
APPLICATION FILED OCT. 28, 1902.
NO MODEL. 4 SHEETS—SHEET 4.

Witnesses
Wm. Boyd
Margaret M. Akers

Inventor
Olaf N. Guldlin
By E. B. Clark
Attorney

No. 764,049. Patented July 5, 1904.

UNITED STATES PATENT OFFICE.

OLAF N. GULDLIN, OF FORT WAYNE, INDIANA.

GAS-WASHER.

SPECIFICATION forming part of Letters Patent No 764,049, dated July 5, 1904.

Application filed October 28, 1902. Serial No. 129,112. (No model.)

*To all whom it may concern:*

Be it known that I, OLAF N. GULDLIN, a citizen of the United States, residing at Fort Wayne, in the county of Allen and State of Indiana, have invented certain new and useful Improvements in Gas-Washers; and I do hereby declare the following to be a full, clear, and exact description of the invention, such as will enable others skilled in the art to which it appertains to make and use the same.

This invention relates to apparatus for washing and purifying gas, and more particularly to improvements in the gas-washer described and claimed in Letters Patent No. 677,865, dated July 9, 1901, granted to me. In the washer of said patent gas is washed and purified by being passed from longitudinal channels through perforated side and crown plates, and thereby caused to escape in numerous small streams through the wash-water or ammoniacal liquor. Valuable results are secured by this method and apparatus; but the flow of liquor over the perforated crown-plates is so slow as to permit impurities to deposit and clog the perforations, thereby decreasing the efficiency of the apparatus. Moreover, in said apparatus the circulation of liquor in the washing-chamber is imperfect, so that the weak liquor at the bottom of the chamber is not effectively utilized. In my present invention these deficiencies in the operation are overcome and increased efficiency secured by providing means for accelerating the flow of liquor over the perforated crown-plates and means for circulating the whole body of liquor through the washing-chamber, so that the weak liquor which has heretofore lain inactive at and near the bottom of the chamber is forced up and over the perforated crown-plates into contact with the numerous streams of outflowing gas, thereby greatly increasing the strength of the liquor in ammonia and the efficiency of the apparatus. The crown-plates are made with numerous perforations having inclined wings or guards which serve to deflect and direct the streams of gas under pressure forward into the stream of liquor, thereby accelerating its flow to the discharge circulating-pipe at the rear end of each washing-channel. A second or supply circulating-pipe extends down into the body of the liquor at the front end of each washing-channel and opens at the upper surface of the perforated crown-plate for permitting the upward flow of weak liquor and thence into contact with the streams of gas passing through the crown-plate. I also provide an overflow-compartment at the rear end of the washing-chamber for receiving surface scum which may be carried by the circulating liquor and conducting it off with the outflowing liquor.

The improvements constituting my invention herein will be defined in the claims.

The details of construction of my improved gas-washing apparatus are illustrated in the accompanying drawings, in which—

Figure 2:
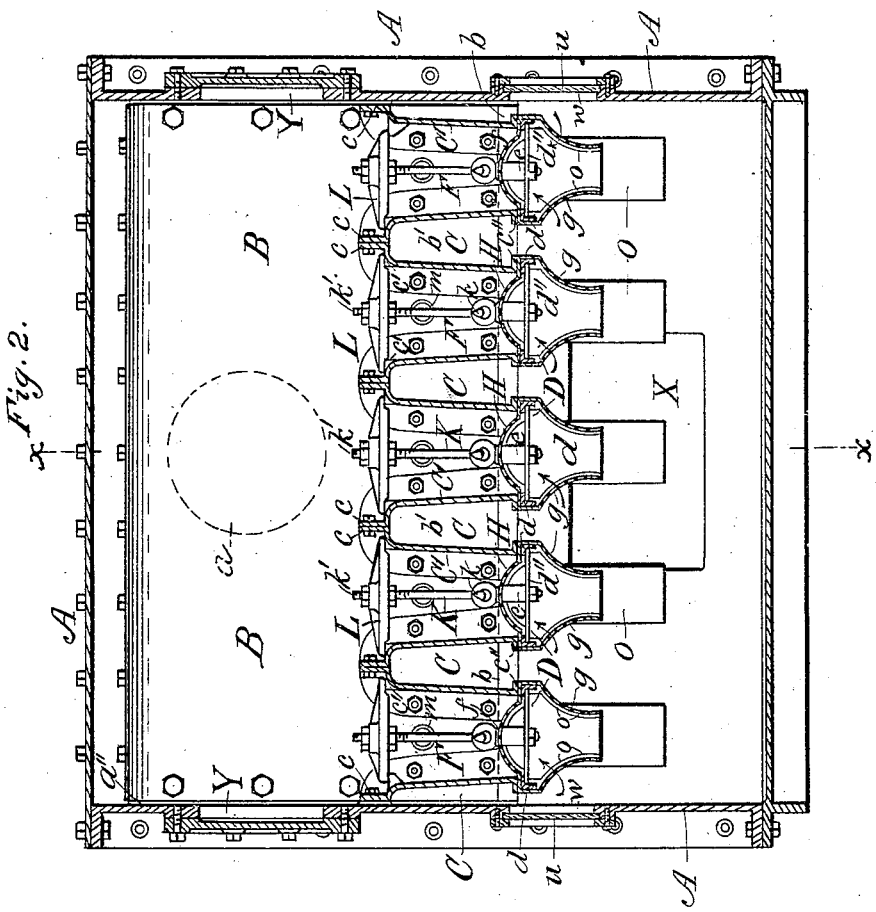
Figure 3:
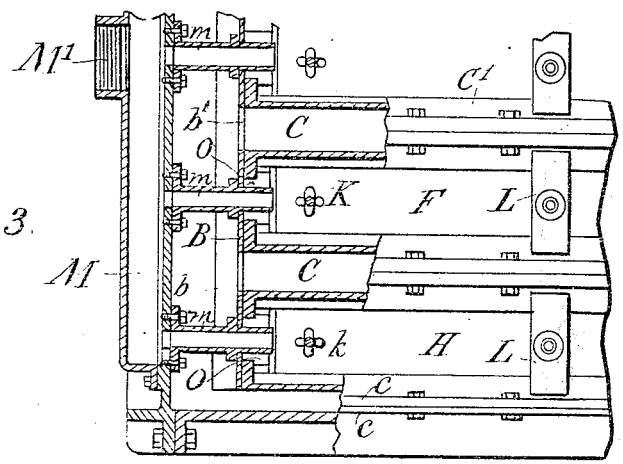
Figure 4:
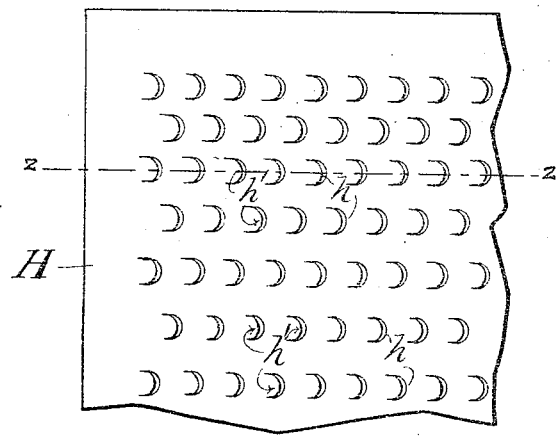
Figure 5:
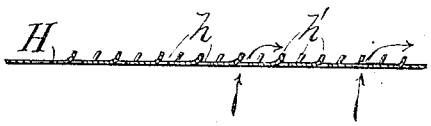
Figure 6:
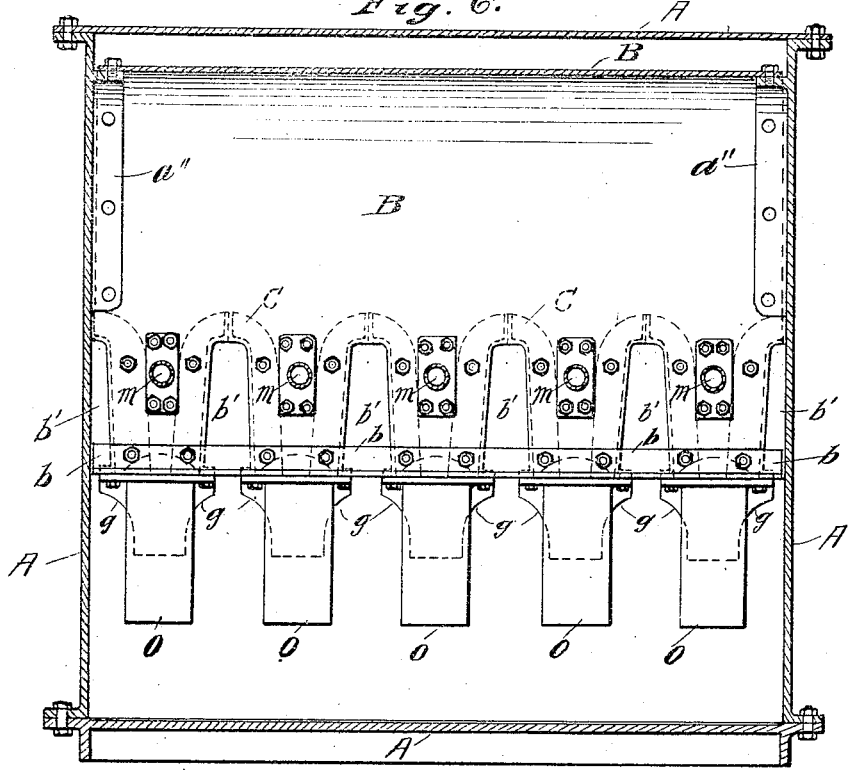
Figure 7:
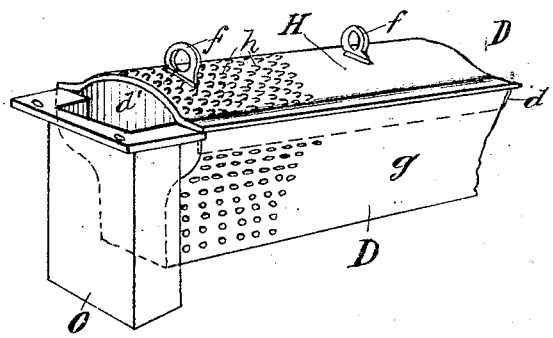

Figure 1 represents a vertical longitudinal section through the gas-washer on the line $x\,x$, Fig. 2, the section being through one of the washing-channels and one of the frames carrying the perforated plates. Fig. 2 represents a vertical transverse section thereof on the line $y\,y$, Fig. 1. Fig. 3 represents a top plan view, partly in horizontal section, showing the gas-induction channels and the gas-washing channels alternating one with the other. Fig. 4 represents a plan view, on enlarged scale, of a part of one of the perforated crown-plates. Fig. 5 represents a longitudinal section of the same on the line $z\,z$, Fig. 4, showing the deflecting wings or guards. Fig. 6 represents a vertical transverse section on line $w\,w$, Fig. 1, through the washer-box looking toward the right or rear end thereof. Fig. 7 represents a perspective view of part of one of the detachable frames carrying perforated plates.

The gas-washer box A is constructed of flanged metal plates, which are securely held together by means of bolts and nuts in a well-known manner. A gas-inlet opening $a$ is provided in one end of the box, to which the gas-supply pipe is bolted, and a gas-outlet opening $a'$ is provided in one side of the box, to which the outlet-pipe is bolted. A gas-deflecting apron B is bolted to the inwardly-projecting flange $a''$, extending horizontally across one end of the box above the gas-inlet $a$ and down both sides of the box, as shown in Figs. 1 and 2, to the normal water-line and has bolted to its lower edge the transverse angle-iron b. The lower edge of this angle-iron b is flush with the lower edges of the inverted gas-induction channels C, as shown in Figs. 1 and 2. In the lower end of the apron is made a transverse row of deep notches or openings b', forming inlets to the gas-induction channels C. The gas-induction channels C are in the nature of inverted troughs open at the bottom and are provided at their inlet ends with flanges, by means of which they are bolted to the apron B around the openings b', as indicated in Figs. 1 and 2. The channels are preferably composed of the hollow longitudinal plates C', having at their upper edges the longitudinal flanges c c, by means of which they are bolted together, as shown in Figs. 1 and 2. At each side of the box one of these hollow plates C' is bolted to the side wall, forming a half-channel, as shown in Fig. 2. The rear ends of the channels C are closed and rest upon the inwardly-projecting flange a''', as shown in Fig. 1. The channel-plates C' have flanged lower edges with flat under surfaces c'' as bearings for the detachable frames D, as clearly shown in Fig. 2.

The gas-induction channels C are suitably spaced apart to form between them the washing-channels F, having at their bottom the frames D, carrying the perforated plates for dividing the gas into numerous small streams. The circulating liquor and streams of escaping gas are passed through the washing-channels F.

The perforated side and crown plates are preferably secured together in a frame D, and the whole frame may be readily detached and removed through the end manholes X for cleaning or repair. The frame D is constructed of the lateral longitudinal angle-irons d, suitable end plates d', the transverse bars d'', the inclined perforated side plates g, and the perforated crown-plate H. The perforated side plates are preferably curved downward and inward, as shown in Fig. 2, and are secured to flanges a and n of the end plates and to the angle-irons d. The crown-plate H is transversely arched, as shown in Fig. 2, and is secured at its edges to the angle-irons d. Eyebolts f, having screw-threaded lower ends, are passed through openings in the crown-plate H and in the cross-bars d'' and are secured by nuts below the cross-bars, as shown in Figs. 1 and 2. Spacing and strengthening sleeves e are applied to the eyebolts between the crown-plate and the cross-bars and rigidly hold the crown-plate against the upper flanges on the eyebolts. The eyebolts f are provided at their upper ends with eyes, with which are engaged the hooks k of the clamping-rods K, by means of which the frames D are suspended and held in position against the lower edges of the inverted channels C. The clamping-rods K have screw-threaded upper ends k', which pass through openings in the transverse supporting-bars L. These bars L rest at their outer ends on shoulders c' at the tops of the channel-plates C', as shown in Fig. 2. The clamping-rods K are drawn up tight and securely held in place by nuts applied above and below the bars L, thereby holding the frames D against the lower edges c'' of the gas-channels C. It will be understood that by means of the above-described devices the frames D may be readily detached for cleaning or repair and can be quickly replaced and secured in operative position. It is to be noted that the perforated side plates g are curved inward toward and below the washing-channels F, so that the streams of gas after passing through the plates will more readily rise through the water and be better subjected to the washing and purifying action thereof.

The front end plates d' of the frames D are cast with the supply circulating-pipes O, which open above the crown-plates, and the rear end plates are cast with the discharge circulating-pipes N, as shown in Figs. 1 and 3. The circulating-pipes N and O extend down below the frames D into the washing-chamber, so as to produce a better circulation of the whole body of liquor and prevent the accumulation of weak liquor in the bottom of the box.

The perforated crown-plate H at the bottom of each washing-channel F is of peculiar and novel construction, as shown in Figs. 4 and 5. The perforations h are conveniently made of crescent or segmental shape, as shown, and the portion of metal which is partly cut out from the openings is bent upward to form inclined wings or guards h', which are inclined forward in the direction of the flow of the liquor. The wings or guards h' by being inclined toward the rear end of the washing-channel F deflect the streams of gas as they escape through the perforations under pressure toward the rear end of the channel. The streams of gas pass into the current of liquor and accelerate its flow toward the discharge end of the channel. The perforations and their inclined guards may be of any desired shape; but the curved segmental shape shown offers less resistance to the passing liquor. The perforations and guards are preferably arranged in one row to break joints with those in the adjacent row, as shown in Figs. 4 and 5.

A main liquor-supply channel M is secured transversely across the front end of the washer, as shown in Figs. 1 and 3, and is provided with an inlet M'. Small discharge-pipes m connect said channel M with the washing-channels F, as shown in Figs. 1 and 3. It will be seen, therefore, that both the circulating liquor rising through pipe O and liquor or water from the outside are supplied to the front ends of the washing-channels F and discharged upon the crown-plate H. The liquor from both sources is accelerated in its flow by the rising deflected streams of gas passing through the perforated crown-plate H, so that all impurities and sedimentary matter are prevented from depositing and clogging the perforations in the crown-plate. The wings or guards h' will also slightly agitate the liquor, so as to better wash the gas. All of the liquor supplied to the crown-plate H is so accelerated in its flow that it passes in a decided current down through the discharge-pipe N, and thus assists the circulation of liquor through the bottom of the chamber, and thence upward through the supply-pipe O into the front end of the washing-channel F.

A drain-pipe P, having a valve p, connects with the middle portion of the bottom of the washing-box and serves for the removal of any tar or other impurities which may settle in the bottom of the box or for drawing off all of the liquor when it is desired to clean or repair any of the interior devices of the box.

An overflow-chamber R is bolted transversely across the outlet end of the washer and is divided by a horizontal partition-plate q into upper and lower compartments r and r'. One or more openings are made in the partition-plate q and are screw-threaded to receive the adjustable screw-threaded liquor-overflow pipes s. A hand-hole is made in the upper part of chamber R and is closed by a tight-fitting cover t, having suitable fastening devices, as shown in Fig. 1. The overflow-pipe s will be adjusted up or down for regulating the height of the liquor in the washer. Any scum and entangled impurities which may rise or collect on the surface of the liquor will be carried by the current of liquor into the overflow-pipe s and thence into the lower compartment r' and off through a pipe s' into an outlet-trap or seal-chamber. (Not here shown.)

A manhole X, having a tight-fitting plate X', is provided, preferably in the inlet end of the washer-box. Another manhole-opening Y, closed by a tight-fitting plate, is also provided in one side of the box, as shown in Figs. 1 and 2. Sight-openings w, closed by glass plates w, are provided in the opposite sides of the box, as shown in Fig. 2, for observing the liquor-level and the action of the gas in its passage through the perforated plates of the frames D.

The normal water-line when no gas is passing through the washer is at about the level of the lower edges of the gas-induction channels C; but when gas is being passed through the washer the level of the water will be depressed immediately below the channels C and caused to rise into the intermediate washing-channel F, according to the volume and pressure of the gas, as explained in my above-mentioned patent. While gas is passing through the induction-channels C, the perforated plates g, and the crown-plates H, water or ammoniacal liquor is fed through the pipes m into the washing-channels F and owing to the pressure of the deflected streams of gas passing through the crown-plates is caused to actively flow over the perforations to the discharge ends of the washing-channels, thence down through the discharge-pipes N into the body of liquor below, and thence up through the supply-pipes O to the upper surfaces of the crown-plates. It will thus be seen that a continuous circulation of the liquor is maintained, so that it is uniformly brought into contact with the streams of inflowing gas, whereby the gas is more perfectly washed and the strength of the liquor in ammonia is greatly increased. The efficiency of the apparatus will therefore be increased.

Having described my invention, what I claim, and desire to secure by Letters Patent, is—

1. In a gas-washer, a perforated plate having inclined wings or guards at the perforations for deflecting the streams of gas and accelerating the flow of liquor, in combination with means for supplying gas below, and liquor above said plate, substantially as described.

2. In a gas-washer, the combination with an open-bottom gas-induction channel and an adjacent gas-washing channel, of a plate having perforations and inclined wings or guards, in the washing-channel, and means for supplying liquor to the upper surface of said plate, substantially as described.

3. In a gas-washer, the combination with a series of inverted gas-induction channels open at the bottom, of perforated plates having deflecting wings or guards at the perforations and arranged between said gas-channels, for causing the issuing streams of gas to accelerate the flow of liquor over the plates, and means for supplying liquor to the upper surfaces of the plates, substantially as described.

4. In a gas-washer, the combination with inverted gas-induction channels and adjacent gas-washing channels, of perforated plates having deflecting wings or guards at the perforations for accelerating the flow of liquor, and placed in said washing-channels, and circulating-pipes opening respectively at the front and rear ends of the washing-channels and extending downward into the chamber for causing liquor to circulate from the washing-channels through the lower part of the chamber, and thence into the channels, substantially as described.

5. In a gas-washer, the combination with inverted gas-induction channels and adjacent gas-washing channels, of perforated plates extending longitudinally in said washing-channels, downwardly-extending circulating-pipes at the front and rear ends of said washing-channels, and liquor-supply pipes discharging above said perforated plates, substantially as described.

6. In a gas-washer, the combination with inverted gas-induction channels and adjacent gas-washing channels, of perforated plates in said washing-channels, liquor-supply pipes discharging above said perforated plates, and a liquor-overflow chamber at the rear end of the washing-channels, substantially as described.

In testimony whereof I affix my signature in presence of two witnesses.

OLAF N. GULDLIN.

Witnesses:
   W. E. STEINNEDELL,
   PIERRE PLANTINGA.